(12) United States Patent
Kyouzuka et al.

(10) Patent No.: US 7,176,901 B2
(45) Date of Patent: Feb. 13, 2007

(54) PORTABLE INFORMATION TERMINAL

(75) Inventors: Masahiko Kyouzuka, Kawasaki (JP); Katsunori Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 380 days.

(21) Appl. No.: 10/631,821

(22) Filed: Aug. 1, 2003

(65) Prior Publication Data

US 2004/0021646 A1 Feb. 5, 2004

(30) Foreign Application Priority Data

Aug. 1, 2002 (JP) .............................. 2002-224477

(51) Int. Cl.
*G09G 5/00* (2006.01)
(52) U.S. Cl. ..................................... 345/173; 345/905
(58) Field of Classification Search ........ 345/173–175, 345/905, 156; 178/18.01, 18.03; 361/681, 361/683
See application file for complete search history.

(56) References Cited

U.S. PATENT DOCUMENTS 5,264,992 A * 11/1993 Hogdahl et al. ............ 361/681
6,035,363 A 3/2000 Fujita
2002/0190956 A1 * 12/2002 Klein et al. ................. 345/169

FOREIGN PATENT DOCUMENTS

| JP | 8-212151 | 8/1996 |
|----|----------|--------|
| JP | 2002-182854 | 6/2002 |

OTHER PUBLICATIONS

Office action from the Japanese Patent Office in the corresponding Japanese patent application dated Jul. 20, 2006.

* cited by examiner

*Primary Examiner*—Regina Liang
(74) *Attorney, Agent, or Firm*—Westerman, Hattori, Daniels & Adrian, LLP.

(57) ABSTRACT

The present invention provides a portable information terminal with fewer differences between models in a parts configuration even when manufacturing a plurality of models with different detectors. The portable information terminal includes an upper cover section and a main body and the upper cover section is provided with a digitizer detecting, when a position on a display screen is pointed, the position and outputting a position signal and a conversion board that converts the position signal output from the digitizer through analog signal lines to a predetermined digital signal and inputs the signal to the main body.

2 Claims, 6 Drawing Sheets

PORTABLE INFORMATION TERMINAL

BACKGROUND OF THE INVENTION

1. Field of the Invention

The present invention relates to a portable information terminal, which accepts data entries with a pen, etc.

2. Description of the Related Art

A portable information terminal including a wide display screen on its top surface and having a function of accepting entries with a pen, etc., without any keyboard is becoming widespread in recent years, and portable information terminals of a palm-size type with a limited processing capacity and a note-size type with a processing capacity comparable to that of a personal computer, etc., are known.

Such a portable information terminal uses a detector called a "tablet," "digitizer" or "coordinate reader," etc., to accept data entries using a dedicated pen or a finger and this detector detects the position of the dedicated pen or finger and obtains a position signal, and specifies the position pointed by the dedicated pen or finger using the position signal.

There are plural types of such detectors with different systems of detecting the position of the dedicated pen or finger, and for example, a type of detector called a "touch panel" using a resistor film whose resistance value changes when it is touched by a finger and a type of detector detecting the position or state of the dedicated pen using principles of electromagnetic induction are known as such detectors. These plural types of detectors have their respective advantages and disadvantages; for example, a resistor film type detector needs no dedicated pen and allows data entries using a finger, etc., but it provides only information corresponding to the position of the screen touched by the finger. On the other hand, an electromagnetic induction type detector can obtain information on the strength or inclination of a pressing force with which the screen is pressed or information on the fact that a key provided for the dedicated pen is clicked, etc., too, but it cannot be used to enter data without the dedicated pen.

Manufacturers of portable information terminals may manufacture only one model having one detector selected from among these plural types of detectors or may manufacture a plurality of models with different types of detectors. At the time of manufacturing a plurality of models, it is preferable that those portable information terminals have a structure with a minimum number of differences among models in a parts configuration.

SUMMARY OF THE INVENTION

The present invention has been achieved in view of the situations described above and it is an object of the present invention to provide a portable information terminal with fewer differences among models in a parts configuration even when a plurality of models with different types of detectors are manufactured.

To attain the above object, a portable information terminal according to the present invention comprises an upper section provided with a display screen displaying information, a detector detecting, when a position on the display screen is pointed, the position and outputting a position signal and a converter converting the position signal output from the detector to a digital signal in a predetermined format and outputting the signal, and a lower section provided with a processing section receiving the digital signal output from the converter, recognizing the position and processing information displayed on the display screen according to the recognized position.

According to the portable information terminal of the present invention, a converter is provided in the upper section and a position signal is converted to a digital signal in a predetermined format, and therefore when a plurality of models with different types of detectors are manufactured, it is possible to handle a plurality of models by only changing the detectors and converters, etc., in the upper section and reduce differences among models in a parts configuration. Furthermore, the above-described converter allows as the digital signal in the predetermined format the use of a digital signal which can be transmitted with fewer signal lines than signal lines necessary to transmit a position signal, which makes it possible to reduce the number of signal lines to transmit a digital signal to the processor in the lower section, thus improving an assembly characteristic of the portable information terminal.

Furthermore, when the above-described detector of the portable information terminal of the present invention outputs an analog position signal, it is preferable because the length of the analog signal lines can be reduced to improve a signal-to-noise ratio.

As described above, according to the portable information terminal of the present invention, there are fewer differences among different models in a parts composition even when manufacturing a plurality of models with different detectors.

DETAILED DESCRIPTION OF THE PREFERRED EMBODIMENTS

Hereunder, embodiments of the present invention will be explained.

Figure 1:
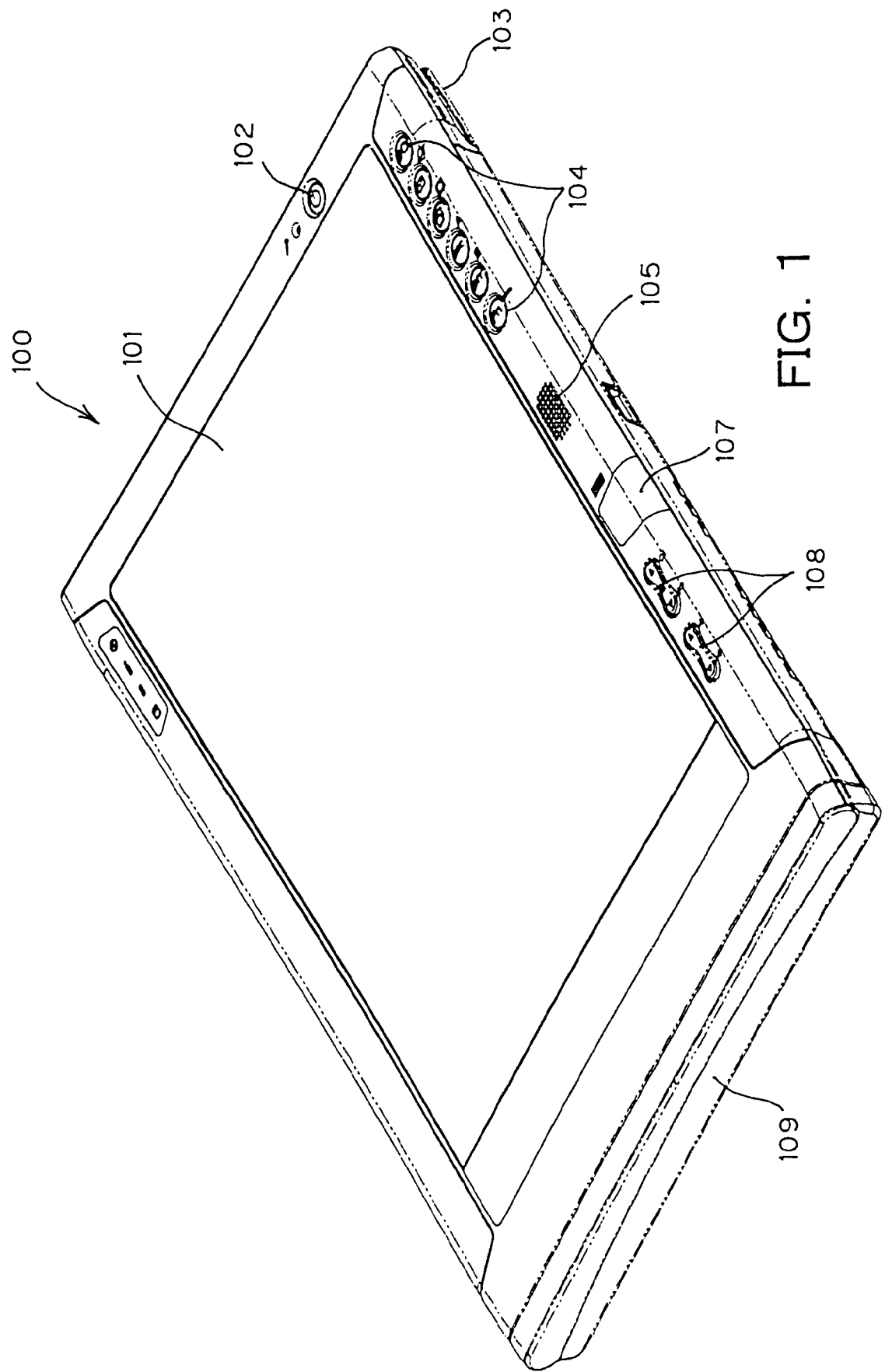
FIG. 1 is an outside perspective view showing a first embodiment of a portable information terminal of the present invention.
Figure 2:
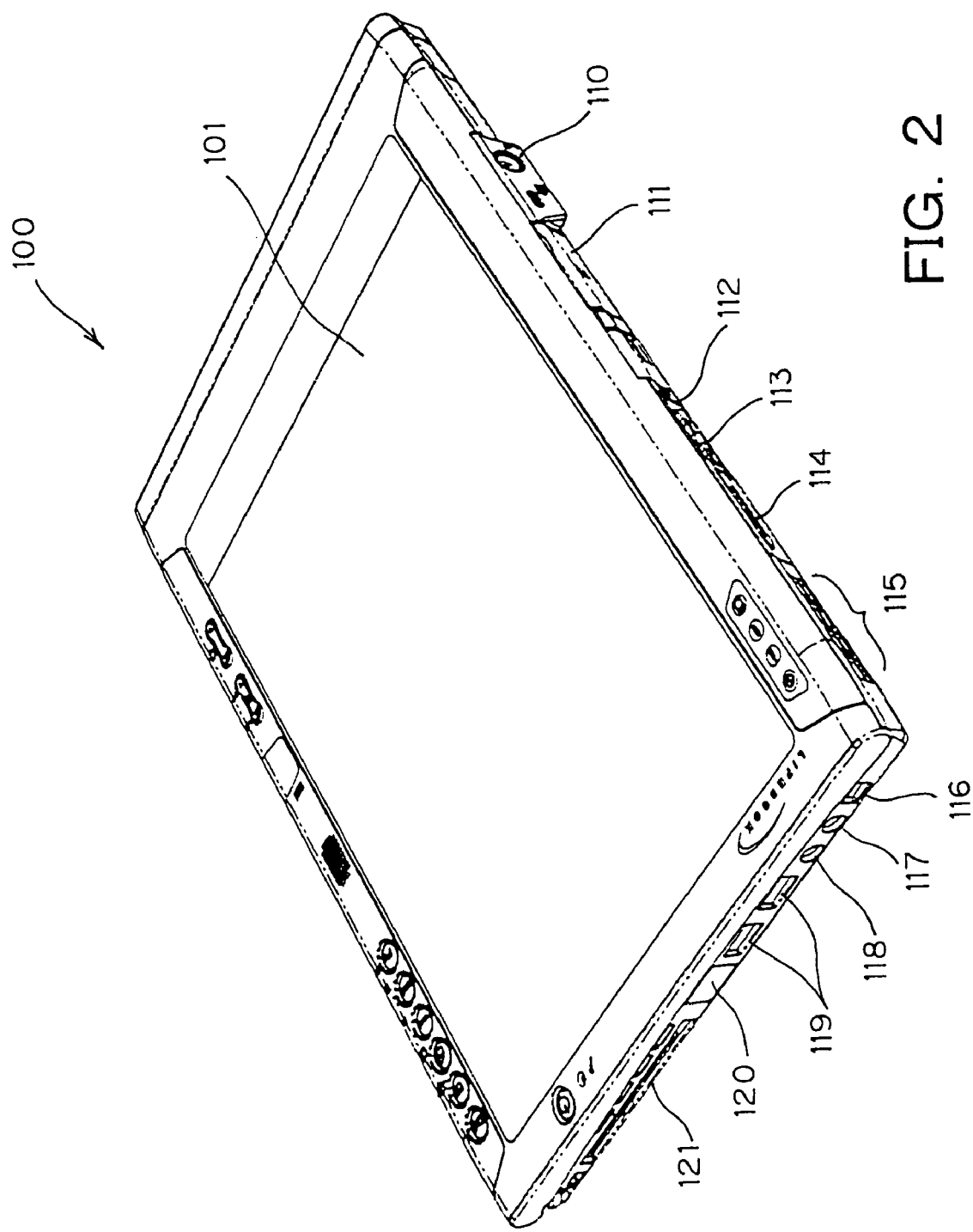
FIG. 2 is an outside perspective view showing the portable information terminal according to the first embodiment of the present invention, viewed from a different direction.

FIG. 1 is an outside perspective view showing a first embodiment of a portable information terminal of the present invention, and FIG. 2 is an outside perspective view showing the portable information terminal according to the first embodiment, viewed from a different direction. The present embodiment will be explained below by using both outside perspectives views.

A portable information terminal 100 is provided with a large-size liquid crystal display panel 101 on the top surface, with a built-in electromagnetic induction type digitizer to detect the position on this liquid crystal display panel 101 pointed with a dedicated pen on the back of the liquid crystal display panel 101. The display screen of the liquid crystal display panel 101 corresponds to an example of the display screen of the present invention and the built-in digitizer corresponds to an example of the detector of the present invention.

Furthermore, the portable information terminal 100 has a configuration suitable for portable usage for data entries using a pen and has similar processing performance and internal functions as those of a personal computer. The portable information terminal 100 incorporates a hard disk apparatus, which will be described later, and a CPU (Central Processing Unit). From outward appearances, it is provided with a power switch 102 for turning on/off main power, a holder 103 for the above-described dedicated pen, six application buttons 104 for starting applications, a speaker 105, an infrared photoreception section 107 for an infrared keyboard, two seesaw switches 108 for moving the cursor and scrolling the screen on the display screen of the liquid crystal display panel 101, a rechargeable battery 109, a power input terminal 110 for a DC power supply, a video output terminal 111 for an external monitor, a LAN (Local Area Network) connector 112 for connecting a LAN cable, a modem output terminal 113, an antenna 114 (built-in) for wireless LAN, a fan vent 115, an IEEE connector 116, a headphone output terminal 117, a microphone input terminal 118, two USB (Universal Serial Bus) connectors 119, an infrared phototransmission/reception section 120 for an infrared interface and a PC card slot 121.

Figure 3:
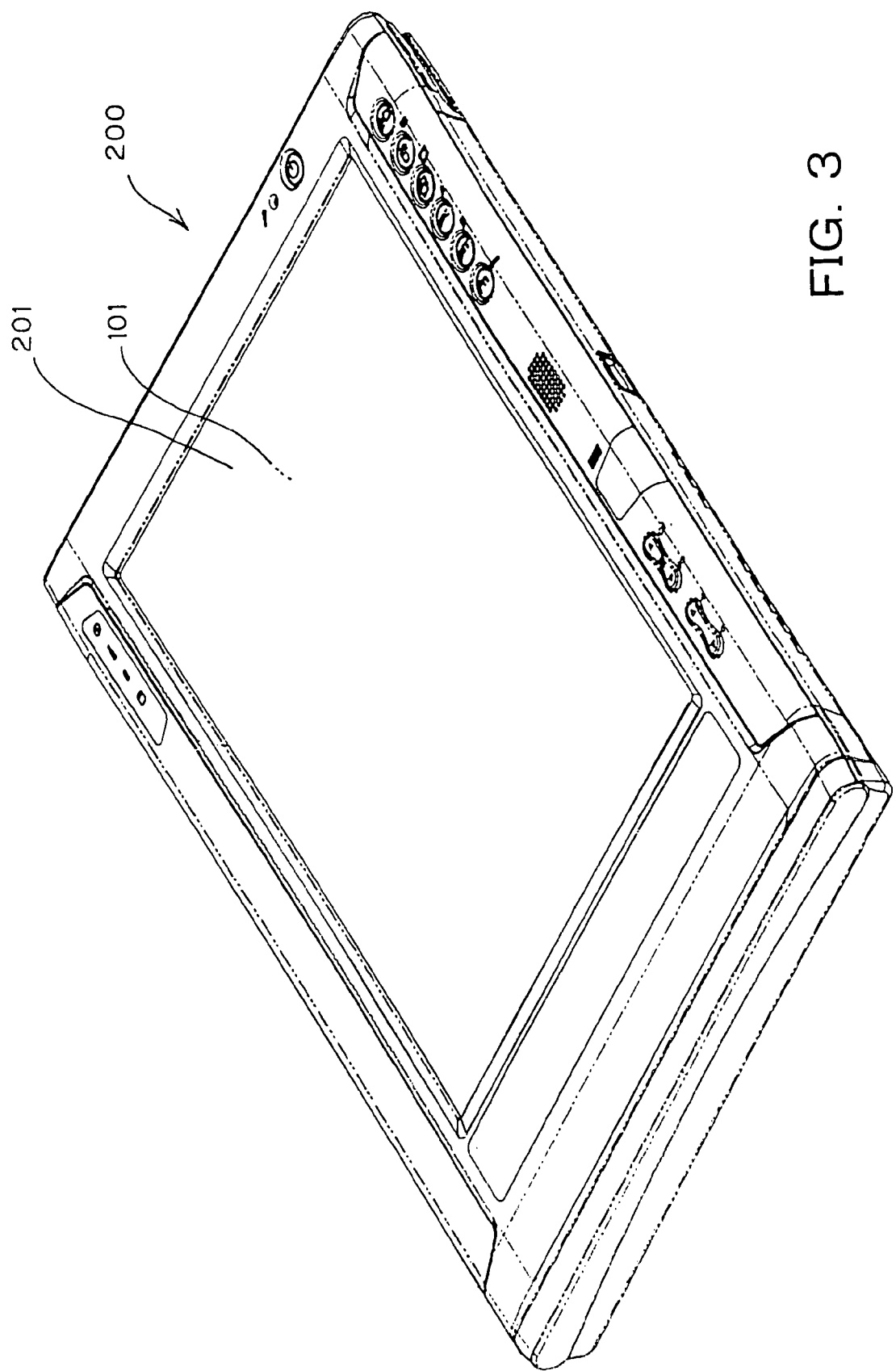
FIG. 3 is an outside perspective view showing a second embodiment of the portable information terminal of the present invention.

FIG. 3 is an outside perspective view showing a second embodiment of the portable information terminal of the present invention.

This portable information terminal 200 is completely the same as the portable information terminal 100 shown in FIG. 1 except that a resistor film type digitizer called a "touch panel" is used as the digitizer. In the following explanations, components common to the first and second embodiments will be assigned common reference numerals to avoid tautological explanations.

The digitizer (touch panel) 201 of the portable information terminal 200 shown in FIG. 3 is transparent and can be directly touched with a finger, etc., and provided on the liquid crystal display panel 101. The digitizer 201 also corresponds to an example of the detector of the present invention.

The internal structures of these embodiments will be explained below.

Figure 4:
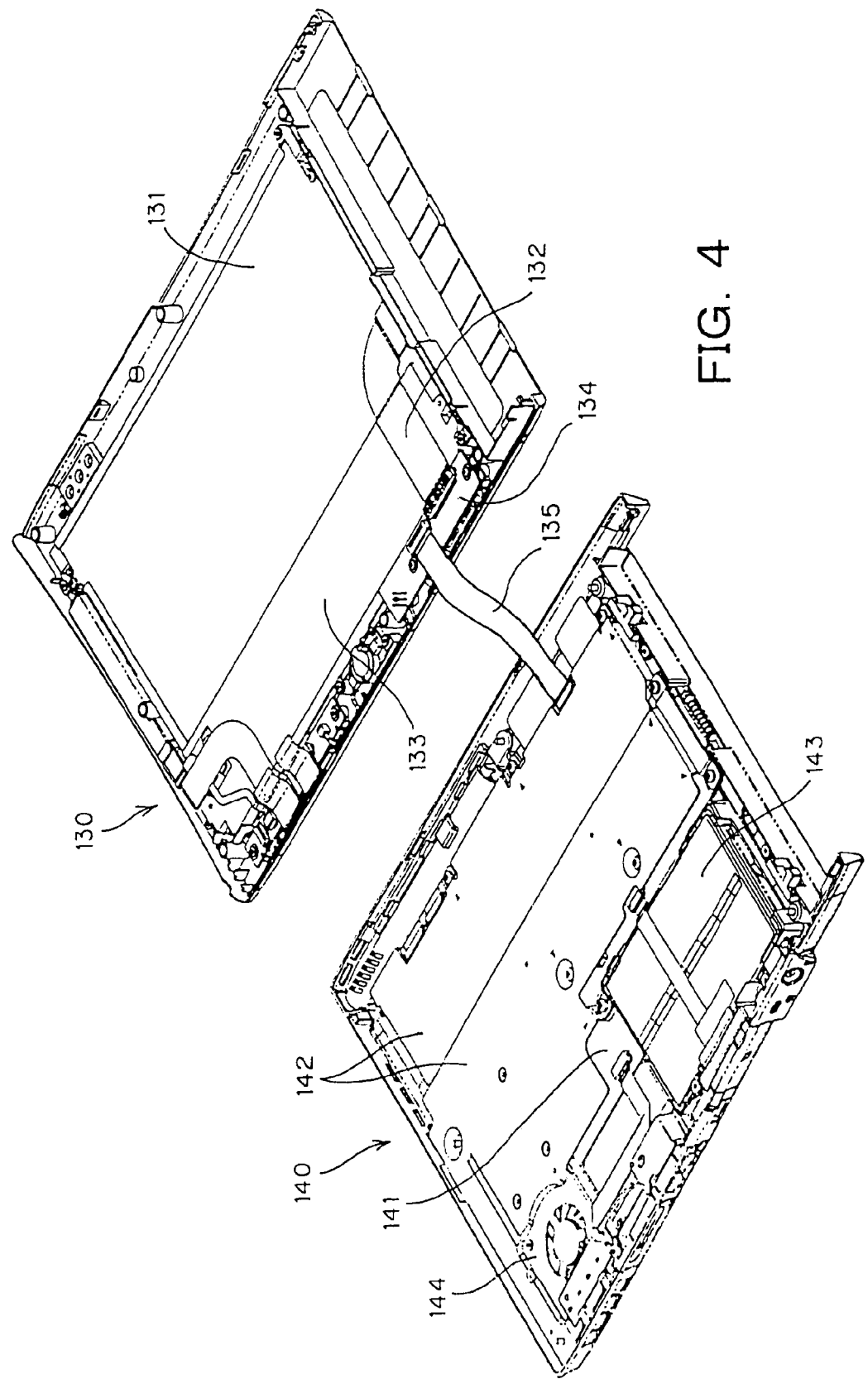
FIG. 4 illustrates an internal structure of the first embodiment of the portable information terminal of the present invention.

FIG. 4 illustrates an internal structure of the first embodiment of the portable information terminal of the present invention.

The portable information terminal of the first embodiment is constructed of an upper cover section 130 that corresponds to an example of the upper section of the present invention and a main body 140 that corresponds to an example of the lower section of the present invention.

Inside the upper cover section 130, a digitizer sensor plate 131 is provided on the back of the above-described liquid crystal display panel 101 and the sensor plate 131 detects the position of the dedicated pen and outputs an analog position signal from 45-pin analog signal lines 132. Furthermore, inside the upper cover section 130 are a control circuit board 133 attached to the above-described liquid crystal display panel 101 and a conversion board 134 that corresponds to an example of the converter of the present invention, etc. The conversion board 134 converts position signals output from the analog signal lines 132 to a digital serial signal, outputs it from 4-pin digital signal lines 135 and inputs it to the main body 140.

Since the conversion board 134 is provided inside the upper cover section 130, there are fewer differences in parts configuration between the portable information terminal of the first embodiment and that of the second embodiment, in which the first and second embodiments adopt different digitizer systems. Furthermore, the conversion board 134 converts a position signal requiring 45-pin signal lines to a serial signal requiring 4-pin signal lines inside the upper cover section 130 and also converts an analog signal to a digital signal, and therefore this reduces the number of digital signal lines 135 to send a signal from the upper cover section 130 to the main body 140, provides an excellent assembly characteristic, reduces the length of the analog signal lines 132 and provides a high signal-to-noise ratio.

On the other hand, inside the main body 140, a main board 141 including a CPU is provided and the main board 141 is almost totally covered with a cover 142. The CPU on the main board 141 corresponds to an example of the processor of the present invention, recognizes the position, etc., of the dedicated pen on the liquid crystal display panel based on a serial signal sent from the conversion board 134 of the upper cover section 130 through the digital signal lines 135 and carries out various types of processing such as selecting or processing information of a display target according to the recognized position. Inside the main body 140 are also a hard disk apparatus 143 for storing data and programs used for information processing, etc., on the main board 141 and a fan 144 for dissipating heat produced inside the portable information terminal to the outside.

Figure 5:
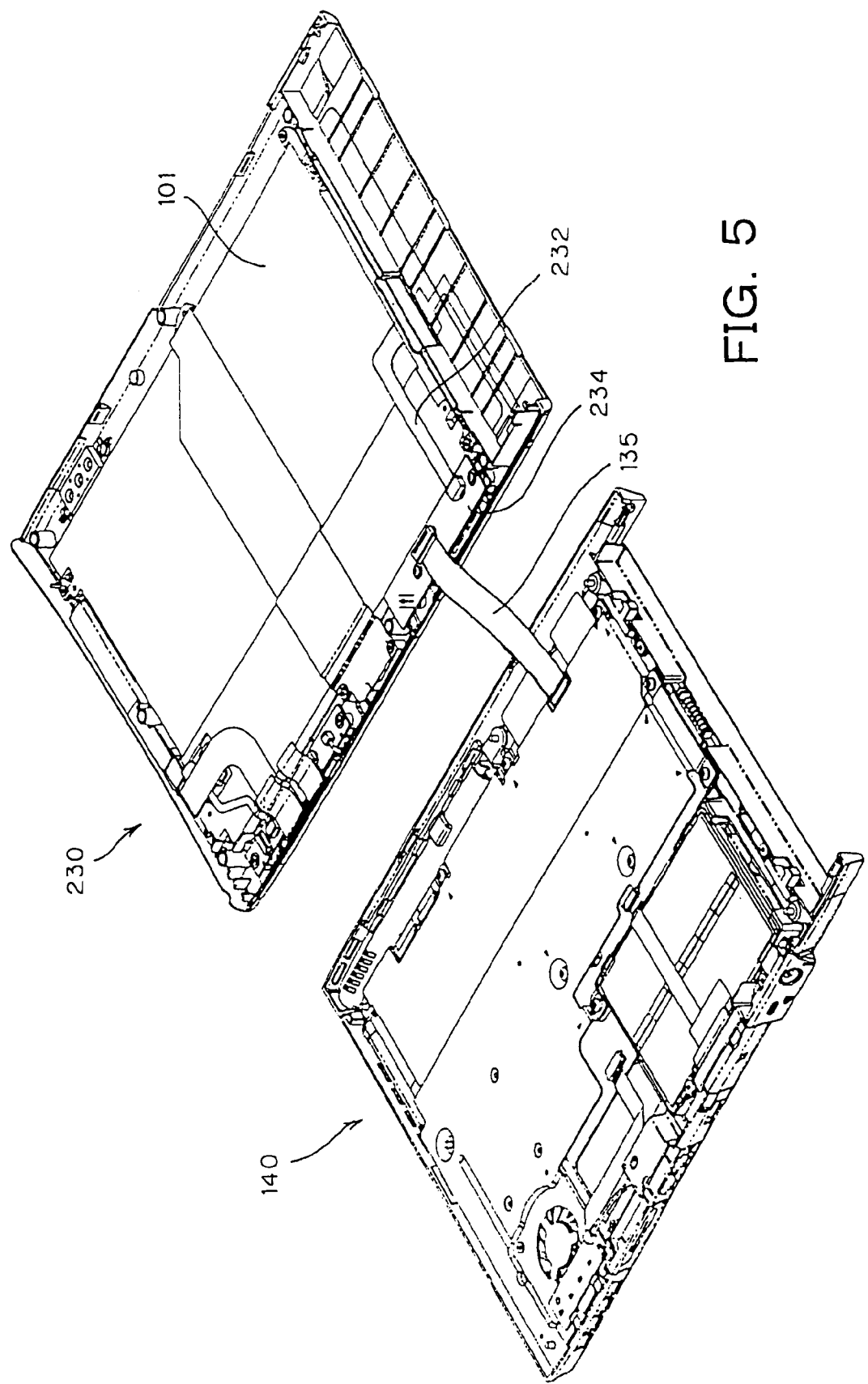
FIG. 5 illustrates an internal structure of the second embodiment of the portable information terminal of the present invention.

FIG. 5 illustrates an internal structure of the second embodiment of the portable information terminal of the present invention.

The portable information terminal of the second embodiment is also constructed of an upper cover section 230 that corresponds to an example of the upper section of the present invention and a main body 140 that corresponds to an example of the lower section of the present invention. The main body 140 of the portable information terminal of the second embodiment is completely the same as the main body of the portable information terminal of the first embodiment.

Inside the upper cover section 230 of the portable information terminal of the second embodiment, the above-described liquid crystal display panel 101 is disposed. A digitizer in the second embodiment is placed on the front of the liquid crystal display panel 101, detects the position of a finger, etc., pointing to the display screen of the liquid crystal display panel 101 and outputs an analog position signal from 4-pin analog signal lines 232. Furthermore, inside the upper cover section 230, there is also a conversion board 234 that corresponds to another example of the converter of the present invention and the conversion board 234 converts the position signal output from the analog signal lines 232 to a digital serial signal in the same format as that of the first embodiment, outputs the signal from 4-pin digital signal lines 135 and inputs it to the main body 140.

Since the conversion board 234 is also provided inside the upper cover section 230 in the second embodiment, the differences between the first and second embodiments having different digitizer systems are limited to differences in the layout of the digitizer itself or differences in the conversion board 234, etc., that is, differences limited to within the upper cover section at most, hence small differences in a parts configuration. For this reason, it is possible to manufacture plural types of models by only replacing the upper cover section.

According to the second embodiment, the number of signal lines is not reduced by the conversion board 234, but since a conversion from an analog to a digital signal takes place inside the upper cover section 230 as in the case of the first embodiment, the second embodiment requires only a short length of the analog signal lines 232, which provides a high signal-to-noise ratio.

Figure 6:
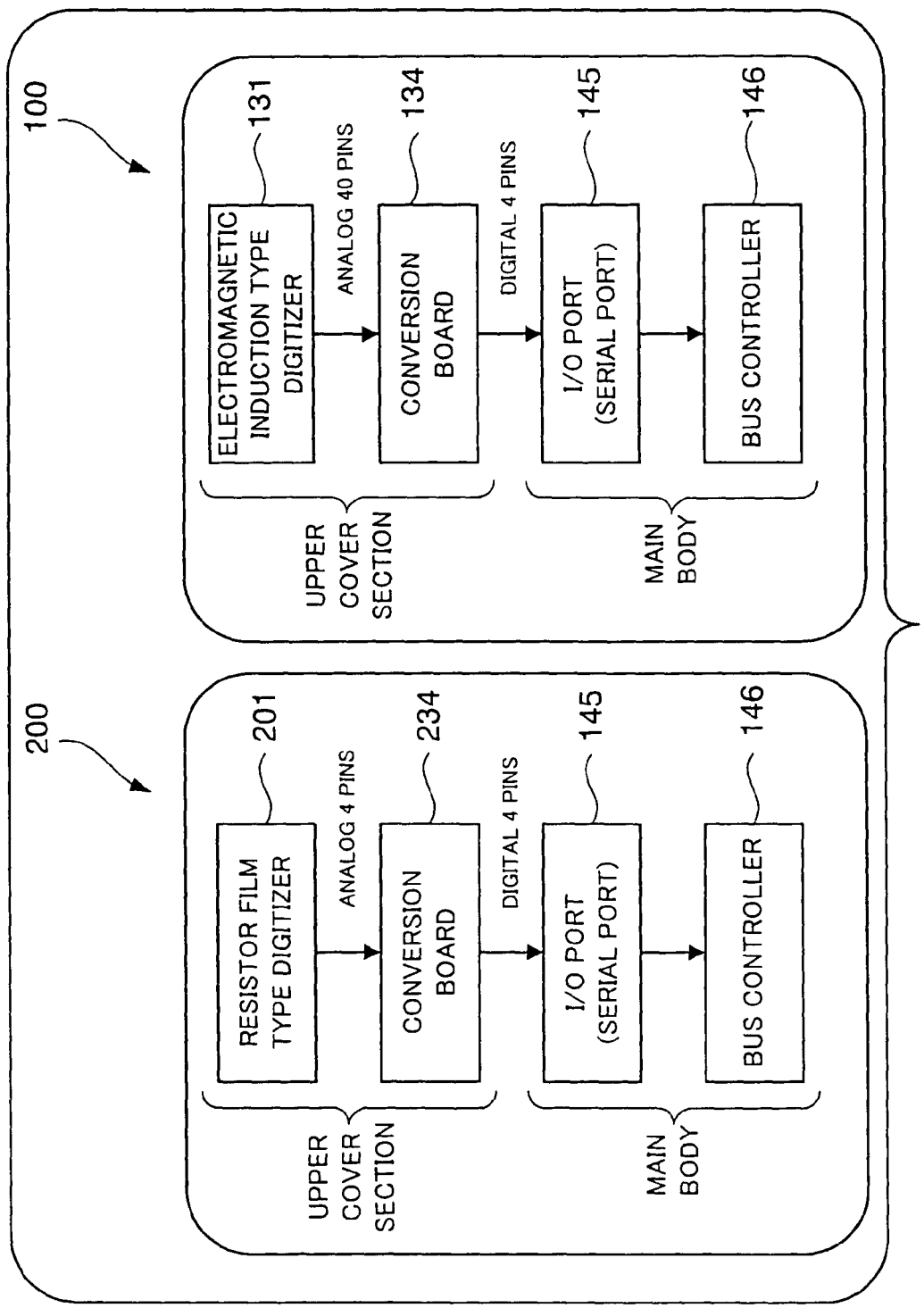
FIG. 6 is a block diagram of a signal transmission section of the portable information terminals of the first embodiment and second embodiment.

FIG. 6 is a block diagram of a signal transmission section of the portable information terminals of the first embodiment and second embodiment.

FIG. 6 shows a block diagram of the function of transmitting position signals output from the above-described electromagnetic induction type digitizer 131 and the resistor film type digitizer 201 to the main board.

In the case of the portable information terminal 100 of the first embodiment, a position signal output from the electromagnetic induction type digitizer 131 is transmitted via 40-pin analog signal lines to the conversion board 134, converted to a digital signal (serial signal) inside the upper cover section and transmitted to the main body through the 4-pin digital signal lines. In the main body, a bus controller 146 on the main board receives the digital signal through an I/O port (serial port) 145 mounted on the above described main board.

On the other hand, in the case of the portable information terminal 200 of the second embodiment, a positional signal output from the resistor film type digitizer 201 is transmitted via 4-pin analog signal lines to the conversion board 234, converted to a digital signal inside the upper cover section and transmitted to the main body through the 4-pin digital signal lines. The digital signal transmitted to the main body is received by a bus controller 146 on the main board through an I/O port 145 provided on the main board in much the same way as in the first embodiment.

Thus, in both the first and second embodiments, an analog position signal is converted to a common digital signal inside the upper cover section, and therefore it is possible to use the main body, which is common to both embodiments.

The above-described explanations have described the resistor film type digitizer and the electromagnetic induction type digitizer as examples of the detector of the present invention, but the detector of the present invention may also be a photo-detection type touch panel, etc.

Furthermore, the above-described explanations have described a conversion board that outputs a serial signal as an example of the converter of the present invention, but the converter of the present invention may also be one that outputs a parallel signal.

What is claimed is:

1. A portable information terminal comprising:
    (1) an upper section selected from either a first upper section or a second upper section,
    wherein the first upper section comprises:
    a first display screen displaying information;
    a first detector detecting, when a position on the first display screen is pointed, the position and outputting a position signal; and
    a first converter converting the position signal output from the first detector to a digital signal in a predetermined format and outputting the digital signal, said first converter being specific to said first display screen and said first detector;
    wherein the second upper section comprises:
    a second display screen displaying information;
    a second detector detecting, when a position on the second display screen is pointed, the position and outputting a position signal; and
    a second converter converting the position signal output from the second detector to a digital signal in a predetermined format and outputting the digital signal, said second converter being specific to said second display screen and said second detector, and
    (2) a lower section provided with a processing section receiving the digital signal output from either the first or second converter, recognizing the position and processing information displayed on either the first or second display screen according to the recognized position,
    wherein said lower section is compatible with both the first upper section and the second upper section.

2. The portable information terminal according to claim 1, wherein the first and second detectors output an analog position signal.

* * * * *